United States Patent [19]
Nishimura

[11] Patent Number: 5,749,268
[45] Date of Patent: May 12, 1998

[54] SIMULATING MULTI-STAGE SPEED CHANGE SHIFT LEVER OPERATING DEVICE

[75] Inventor: Eiji Nishimura, Tokyo, Japan

[73] Assignee: Sega Enterprises, Ltd., Tokyo, Japan

[21] Appl. No.: 391,419

[22] Filed: Feb. 16, 1995

[30] Foreign Application Priority Data

Feb. 21, 1994 [JP] Japan .................... 6-046355

[51] Int. Cl.⁶ .................................... B60K 20/04
[52] U.S. Cl. .................. 74/473 R; 74/475; 74/471 XY
[58] Field of Search .................. 74/473 R, 475, 74/519, 528, 526, 545, 471 XY

[56] References Cited

U.S. PATENT DOCUMENTS

| | | | |
|---|---|---|---|
| 3,479,898 | 11/1969 | Prager | 74/471 XY |
| 4,077,275 | 3/1978 | Kluge et al. | 74/473 R |
| 4,646,582 | 3/1987 | Kijima | 74/473 R |
| 5,249,478 | 10/1993 | Moroto et al. | 74/475 |
| 5,351,570 | 10/1994 | Mizunuma et al. | 74/473 R |

*Primary Examiner*—Charles A. Marmor
*Assistant Examiner*—David M. Fenstermacher
*Attorney, Agent, or Firm*—Price, Gess & Ubell

[57] ABSTRACT

The present invention provides a simulating multi-stage speed change shift lever operating device capable of simulating an operation similar to that of a driver riding in an actual vehicle and operating a shift lever of a manual speed change gear in multi-stage speed changing operation. The shift lever 2 is oscillatably pivoted around the pivot shafts 6 at the oscillation supporting member 24 in a forward or rearward direction, the returning resilient roller 35 pivotally supported at the oscillation supporting member 24 through the projecting shaft 29 is held by a pair of right and left bolts 39 pivotally fixed to the front plate 8, and the lower end 4 of the shift lever 2 bypasses around the outer circumferences of a pair of forward or rearward resilient guide rollers 19 and the guide rollers 21.

16 Claims, 9 Drawing Sheets

SIMULATING MULTI-STAGE SPEED CHANGE SHIFT LEVER OPERATING DEVICE

BACKGROUND OF THE INVENTION

1. Field of the Invention

This invention relates to a simulating multi-stage speed change shift lever operating device capable of simulating an operation similar to one in which a driver rides on an actual vehicle to operate multi-stage speed change of a shift lever of a manual speed change gear.

2. Description of the Related Art

In the manual operating multi-stage speed change gear applied in a vehicle, the shift lever was operated along an H-shaped shift pattern or another shift pattern and in the case of its simulating type, the shift lever was passed through grooves having the same shape as the shift pattern and then the shift lever was operated along the shift pattern grooves.

In the simulating multi-stage speed change shift lever operating device having such a structure as one described above, when the shift lever was changed over from one speed change operating position to the other speed change operating position located at a direction of orthogonal line, it was difficult to position the shift lever at a direction changing-over location between a forward or rearward direction and a rightward or leftward direction, and when the shift lever was moved along the rightward or leftward direction to be changed over to the forward or leftward groove, the shift lever abutted against the side wall of the forward or rearward groove to generate uncomfortable shock or noise and an operator got a feeling different from that obtained from an actual speed changing operation.

SUMMARY OF THE INVENTION

The present invention relates to an improvement over a simulating multi-stage speed change shift lever operating device overcoming such disadvantages described above, wherein the shift lever substantially upright in a vertical direction is operated along a flat plane in compliance with a predetermined locus, and its gist consists in an arrangement in which there are provided a base block; an oscillation supporting member pivotally supported at the base block in an oscillating manner around the forward or rearward shaft directed forward or rearward or around the rightward or leftward shaft directed rightward or leftward; a shift lever pivotally supported at the oscillation supporting member around the rightward or leftward shaft or the forward or rearward shaft; a resilient returning means for returning the oscillation supporting shaft or the shift lever to the vertical plane passing through the forward or rearward shaft or the shaft in parallel with the former shaft; and a plurality of resilient guide rollers for holding the lower end of the shift lever and rotatably pivoted around the vertical shaft in forward or rearward direction, wherein the lower end of the shift lever can be contacted with the circumferential surfaces of the resilient guide rollers.

Since the present invention is constructed as described above, releasing the hand off the top end grip of the shift lever causes the shift lever to be directed toward a vertical direction passing through the forward or rearward shaft or the shaft in parallel with the former shaft with a resilient returning force of the resilient returning means, resulting in that the lower end of the shift lever is held by the forward and rearward guide rollers and the shift lever is held at a neutral state in the vertical direction.

Applying a leftward force to the top end grip of the shift lever and also applying a forward or rearward force to it under its vertical neutral state overcome a resilient returning force of the resilient returning means cause the shift lever to be inclined in a leftward direction and concurrently the lower end of the shift lever moves forwardly or rearwardly while being guided by a ¼ arcuate surface of the resilient guide roller opposite to the pressing direction of the grip and the top end grip of the shift lever can be located at the desired first speed position of the top end grip of the shift lever.

In the case that the shift lever is operated to a next stage speed change operating position in an orthogonal direction under a state in which the shift lever is operated to a certain speed change position, the top end grip of the shift lever is pressed toward the orthogonal direction, resulting in that the lower end of the shift lever is moved along a ¼ arcuate surface of one resilient guide roller contacted with the lower end of the shift lever at the certain speed change position, thereafter the lower end moves along the ¼ arcuate surface of the other resilient guide roller in an orthogonal direction and the top end grip of the shift lever can be located at the position of the desired next stage speed change position.

As described above, the present invention can perform an operation which is similar to an actual multi-stage speed change shift lever.

In the present invention, when the shift lever is not operated along a groove having the same shape as that of the operating pattern, but operated to a next stage speed change operating position in an orthogonal direction from a certain speed change position, the lower end of the shift lever is moved along the ¼ arcuate surface of one resilient guide roller and then moved along the ¼ arcuate surface in an orthogonal direction of the other resilient guide roller, and the top end grip of the shift lever can be operated in a substantial tangential curved line from the ¼ arc adjacent to a central point of a character "8" along the ¼ arcuate surface in the slant direction, resulting in that no striking sound is produced when the operating direction of the operating lever is changed over and no friction or noise caused by its movement within the groove may occur as well and the lever can be operated silently and smoothly in the same operating feeling as that for the actual lever and so a utilizer can obtain a realistic feeling.

In addition, the present invention enables the shift lever to be changed over at both right and left sides in a forward or rearward direction and a four-stage change speed operation to be simulated.

In addition, the present invention enables the shift lever to be changed over along locus of six locations of a central location, right and left locations, forward and rearward locations, i.e. two Hs contacted at right and left sides in side-by-side relation and a six-stage speed change device can be simulated.

In addition, the present invention enables the oscillation supporting member to be formed in an elongated shape in forward or rearward direction in correspondence with a plan view occupied by the resilient guide rollers arranged in forward or rearward direction, resulting in that the simulating multi-stage speed change shift lever operating lever device can be made compact.

Further, the present invention enables a thickness and a length of each of a pair of right and left holding resilient members to be changed and a right or left operating reaction force of the shift lever to be properly set and concurrently a local deformation of the holding resilient member can be avoided to improve durability of the holding resilient member.

In addition, the present invention enables a soft operating reaction force to be obtained even if a coefficient of resiliency of the resilient returning means is relatively high and concurrently these resilient returning members may not be largely deformed always at the same location under rotation of each of the resilient returning roller and the resilient holding and pressing roller, plastic deformation of these members may be avoided and their durability is maintained.

In addition, the present invention enables a smooth operation of the shift lever during a direction changing operation of the shift lever to be carried out and concurrently the lower end of the shift lever forcedly pushes the resilient returning roller during operation of the shift lever to cause the resilient returning roller to be abnormally and substantially deformed, resulting in that a remarkable unstable swinging of the shift lever is prevented by the non-resilient guide rollers having a smaller diameter than that of the resilient returning roller and the operation of the shift lever is appropriately held.

In addition, the present invention enables a grip left-side operating amount when the grip of the shift lever is operated from its neutral state to its left-side position to be larger than a grip right-side operating amount from its neutral state in a rightward direction and then an operating feeling alike an operating feeling in the actual driving of vehicle can be given to a utilizer.

DETAILED DESCRIPTION OF THE PREFERRED EMBODIMENTS

Figure 1:
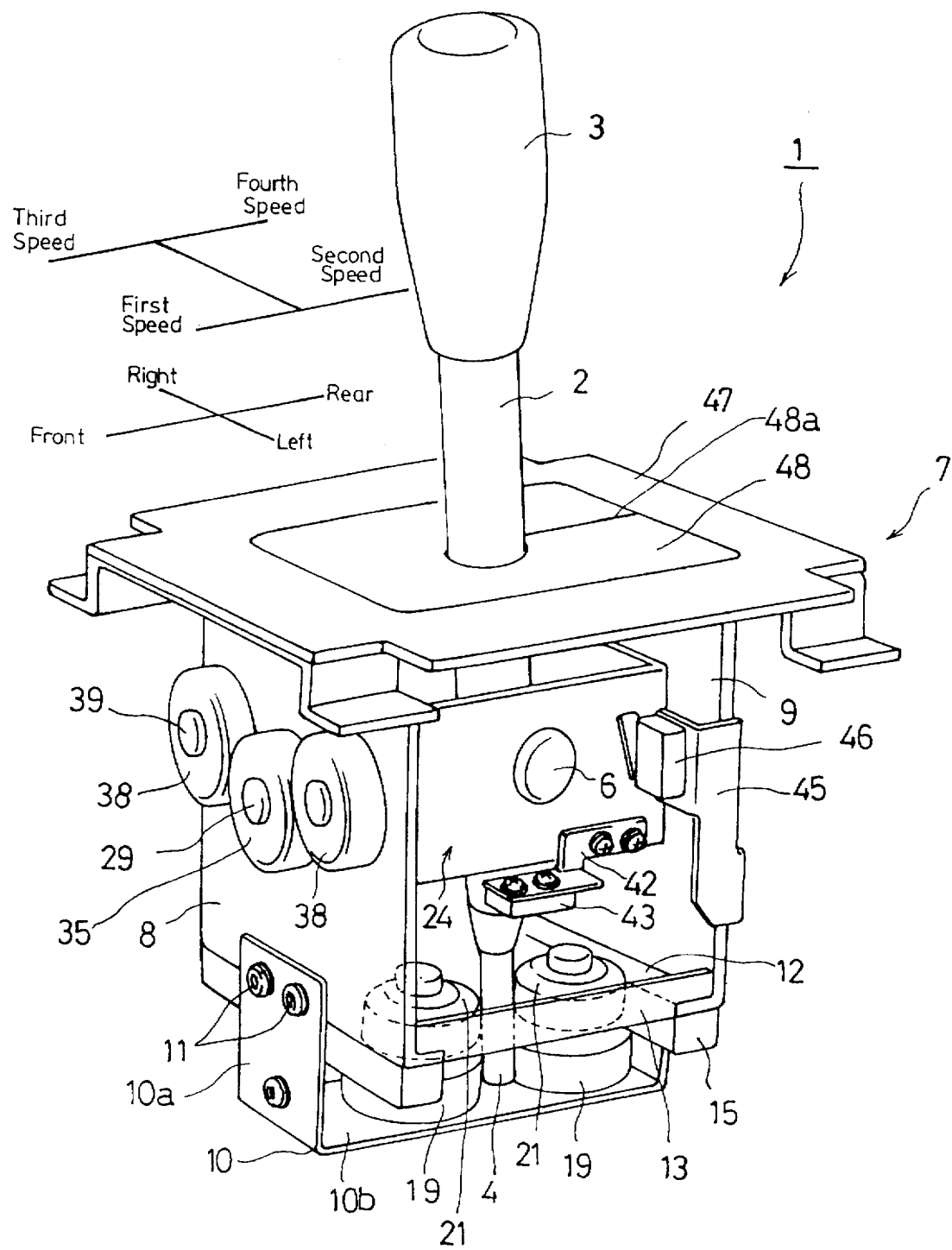
FIG. 1 is a perspective view for illustrating one preferred embodiment of the simulating multi-stage speed change shift lever operating device of the present invention.
Figure 2:
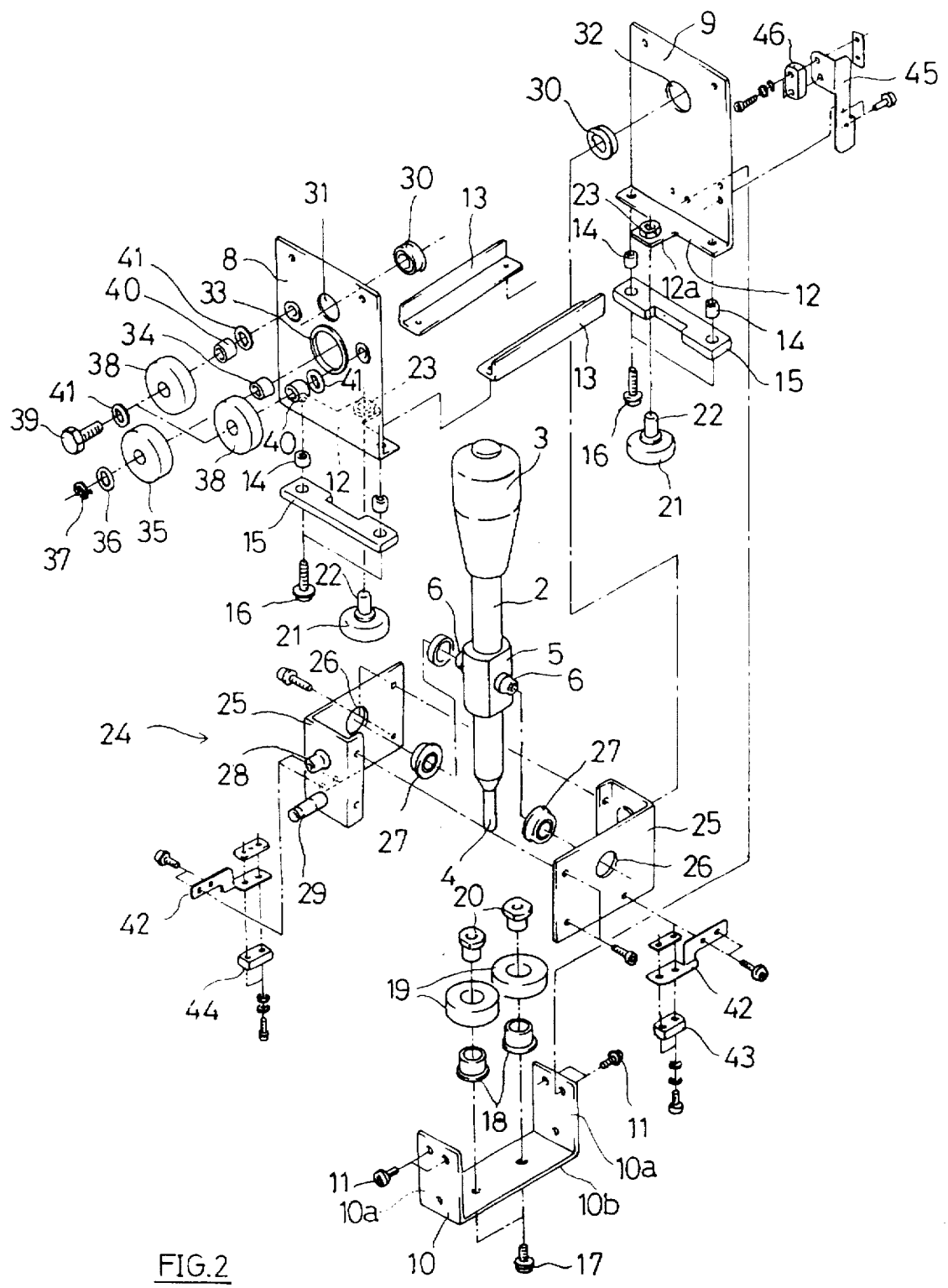
FIG. 2 is an exploded perspective view of FIG. 1.

Referring now to FIGS. 1 to 6, one preferred embodiment of the present invention in which the present invention is applied to the four-stage speed change shift lever operating device will be described.

The simulating four-stage speed change shift lever operating device 1 shown in FIGS. 1 to 6 is operated such that a shift lever 2 is operated to move from a central neutral position of "H" along a locus of "H" and can be operated to move to the first and the second speed positions at the left forward and rearward ends of "H" and the third and the fourth speed positions at the right forward and the rearward ends of "H" as described later.

The aforesaid simulating four-stage speed change shift lever operating device 1 is constructed such that the top end of the shift lever 2 is provided with a grip 3, the lower end of the shift lever 2 is formed to have a smaller diameter as compared with that of the central part of the shift lever, and pivot shafts 6 directed rightward and leftward are integrally projected and arranged at the right and left side surfaces of the pivoting part 5 located at the central part of the shift lever 2.

In addition, a base block 7 is constructed such that raised pieces 10a of U-shaped plate 10 are abutted against both lower ends of a front plate 8 and a rear plate 9; both of them are integrally connected by screws 11; both ends of a pair of angled plates 13 are placed on upper surfaces of both ends of T-shaped bent pieces 12 of the front plate 8 and the rear plate 9; sleeves 14 and reinforcing members 15 are abutted against the lower surfaces of the T-shaped bent pieces 12, respectively; and the T-shaped bent pieces 12, angled plates 13, sleeves 14 and reinforcing members 15 are integrally connected by screws 16.

The reinforcing members 15 are abutted against the lower end 4 of the shift lever 2 so as to act as a restricting member for restricting a range of forward or rearward oscillation of the shift lever 2.

In addition, bearings 18, rubber resilient guide rollers 19 and female screws 20 are fitted in sequence to a pair of front and rear male screws 17 passing through the horizontal piece 10b of the U-shaped plate 10 from its lower part to its upper part, and a pair of resilient guide rollers 19 are rotatably pivoted to the U-shaped plate 10, respectively.

In addition, shaft portions 22 of steel guide rollers 21 having a slight smaller diameter than that of the resilient guide rollers 19 are rotatably pivoted at the bearings 23 at the central portions 12a of the T-shaped bent pieces 12 with a wider clearance than a central clearance of a pair of aforesaid resilient guide rollers 19 being left therein.

Pivot shafts 6 of the shift lever 2 are pivotally fitted through bearings 27 to the side holes 26 of the right and left L-shaped plates 25 constituting an oscillation supporting member 24; a forward or rearward shaft 28 is projected at the forward or rearward portions of the L-shaped plates 25, and a projecting shaft 29 is projected below the forward or rearward shaft 28; the forward or rearward shaft 28 is pivoted to the pivot holes 31, 32 of the front plate 8 and the rear plate 9 through bearings 30; and the shift lever 2 can be oscillated forward or rearward around the pivot shafts 6 and oscillated rightward or leftward around the forward or rearward shaft 28.

In addition, the projecting shaft 29 projected forwardly passes through a large diameter hole 33 of the front plate 8 and projects forwardly; the resilient returning roller 35 is fitted to the projecting shaft 29 through the sleeve 34; and a ring 36 and a circle clip 37 are fixed to the extremity end of the projecting shaft 29 projected from the resilient returning roller 35.

In addition, a pair of right and left resilient holding and pressing rollers 38 are pivoted to the front plate 8 by the bolts 39 threadably fitted to the front plate 8 with the resilient returning roller 35 being held therebetween; the sleeves 40 are placed at the bolts 39 and the resilient holding and pressing rollers 38; washers 41 are fitted to the bolts 39; and a pair of right and left resilient holding and pressing rollers 38 hold and press the resilient returning roller 35 from its right and left sides.

Further, to the right and left L-shaped plates 25 of the oscillation supporting member 24 are fixed a forward oscillation sensing limit switch 43 and a rearward oscillation sensing limit switch 44 through the brackets 42; one rightward or leftward oscillation sensing limit switch 46 is fixed to the rear plate 9 through a bracket 45; and limit switch pushing pieces 49 are fixed to both right and left sides of the pivoting part and a rear side of the L-shaped plate 25, respectively (the fixed state of the limit switch pushing pieces 49 is not shown at the pivoting part 5).

In addition, the top end of the base block 7 is provided with a top plate 47 having an opening (not shown) through which an "H" locus operation of the shift lever 2 is performed; the opening is covered by a cover 48; and the cover 48 is formed with a slit 48a for use in fitting the shift lever 2.

Since the preferred embodiment shown in FIGS. 1 to 6 is constructed as described above, the resilient returning roller 35 is held and pressed by a pair of right and left resilient holding and pressing rollers 38, the shift lever 2 is maintained in a vertical plane passing through a forward or rearward shaft 28, the lower end 4 of the shift lever 2 is held by the forward and rearward resilient guide rollers 19 and maintained in a vertical plane passing through the right and left pivot shafts 6, resulting in that the shift lever 2 is held at upright in a vertical direction of it in its neutral state under a condition in which no operating force is given to the shift lever 2.

In order to operate the shift lever 2 in an "H" locus pattern and to shift up the simulating four-stage speed change shift lever operating device 1 in sequence, the grip 3 is moved leftward and then moved forward to enable the shift lever to set to the first speed, then when the grip 3 is pulled toward an operator, the shift lever can be set to the second speed, then the grip 3 is returned to an intermediate position between the first speed position and the second speed position, and moved rightward, thereafter the grip is moved forward to enable it to be set to the third speed and lastly the grip 3 is moved toward the operator to enable the device to set to the fourth speed.

Reverse operation in sequence opposite to the aforesaid operation enables the shift lever to be shifted down.

In addition, in the case that the grip 3 is inclined leftward and changed over from the first speed to the second speed or from the third speed to the first speed or in the case that the grip 3 is inclined rightward and changed over from the third speed to the fourth speed or from the fourth speed to the third speed, the lower end 4 of the shift lever 2 is located at the right side or left side of the forward or rearward resilient guide rollers 19, not hindered with the resilient guide rollers 19 but moved forward or rearward, resulting in that the shift lever can be operated without accepting a substantial speed changing reaction force similar to that of the actual four-speed shift lever operation.

Figure 3:
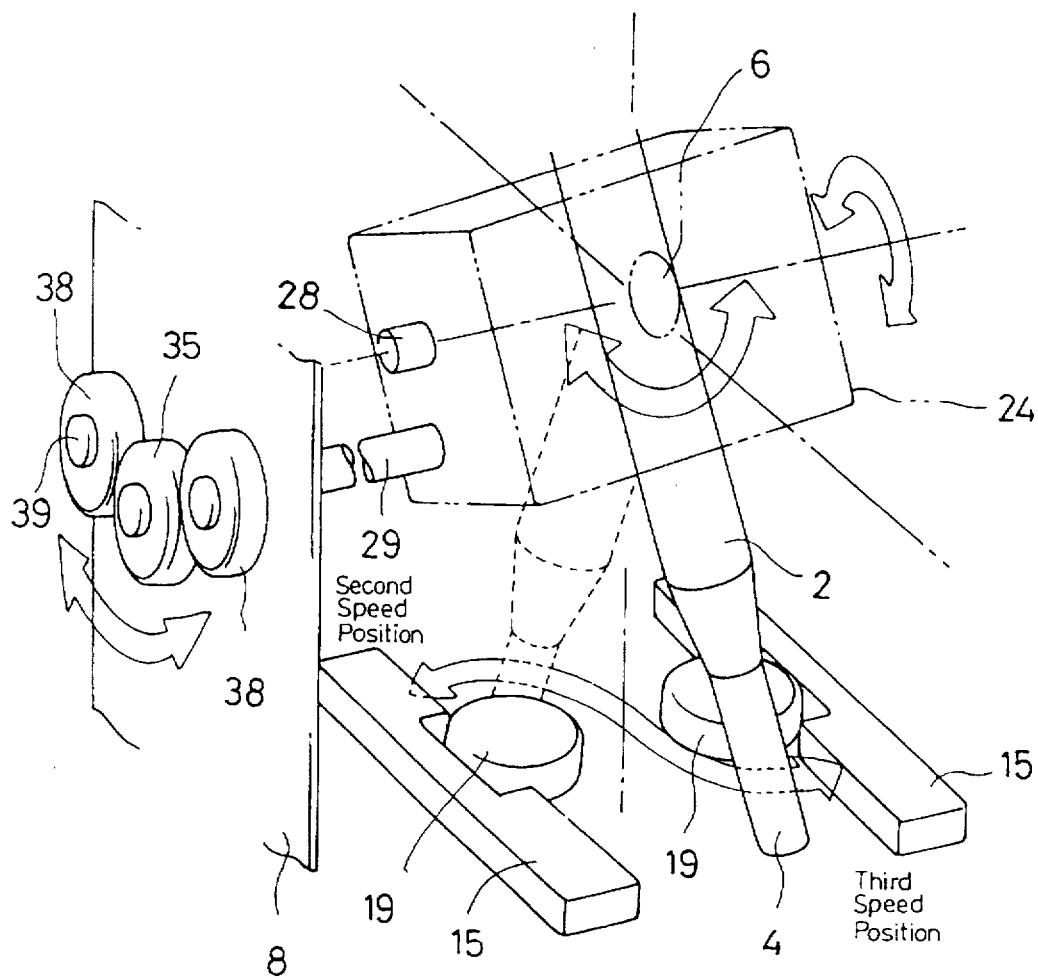
FIG. 3 is a substantial part perspective view for illustrating an operating state of the preferred embodiment shown in FIG. 1.
Figure 4:
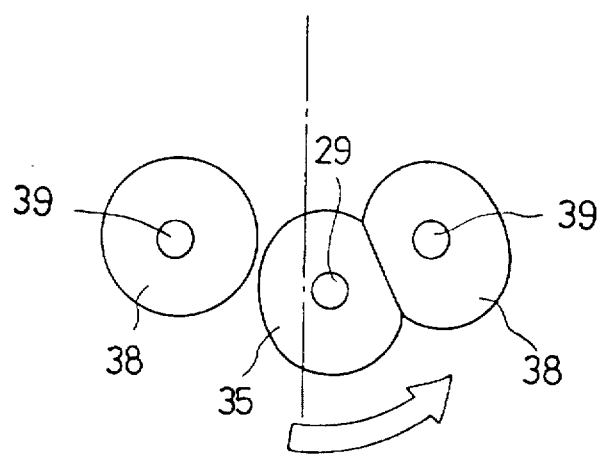
FIG. 4 is a front elevational view for illustrating resilient deformed states of the resilient returning roller and resilient holding and pressing rollers in the case that the shift lever is inclined in a rightward or a leftward direction.
Figure 5:
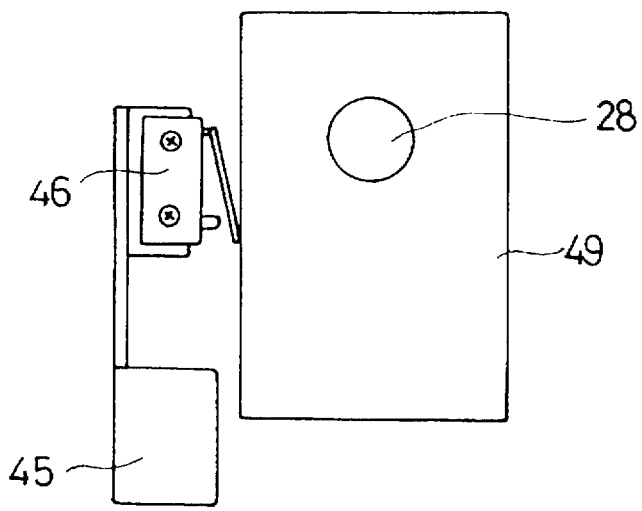
FIG. 5 is a front elevational view for illustrating a state before the bracket having the oscillation sensing limit switch fixed thereto is not deformed.
Figure 6:
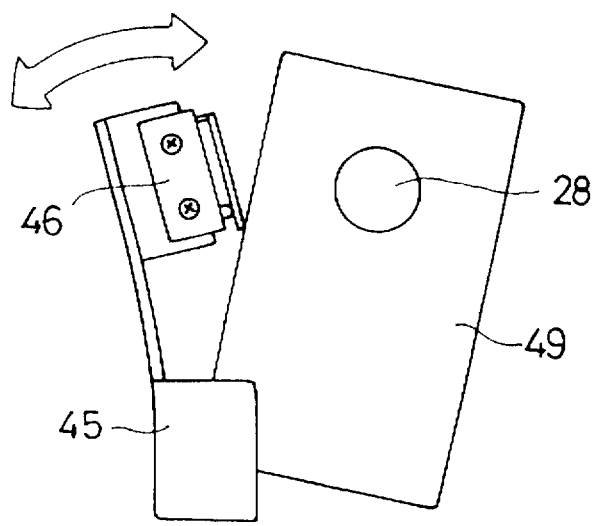
FIG. 6 is a front elevational view for illustrating a state in which the bracket in FIG. 5 is deformed.
Figure 7:
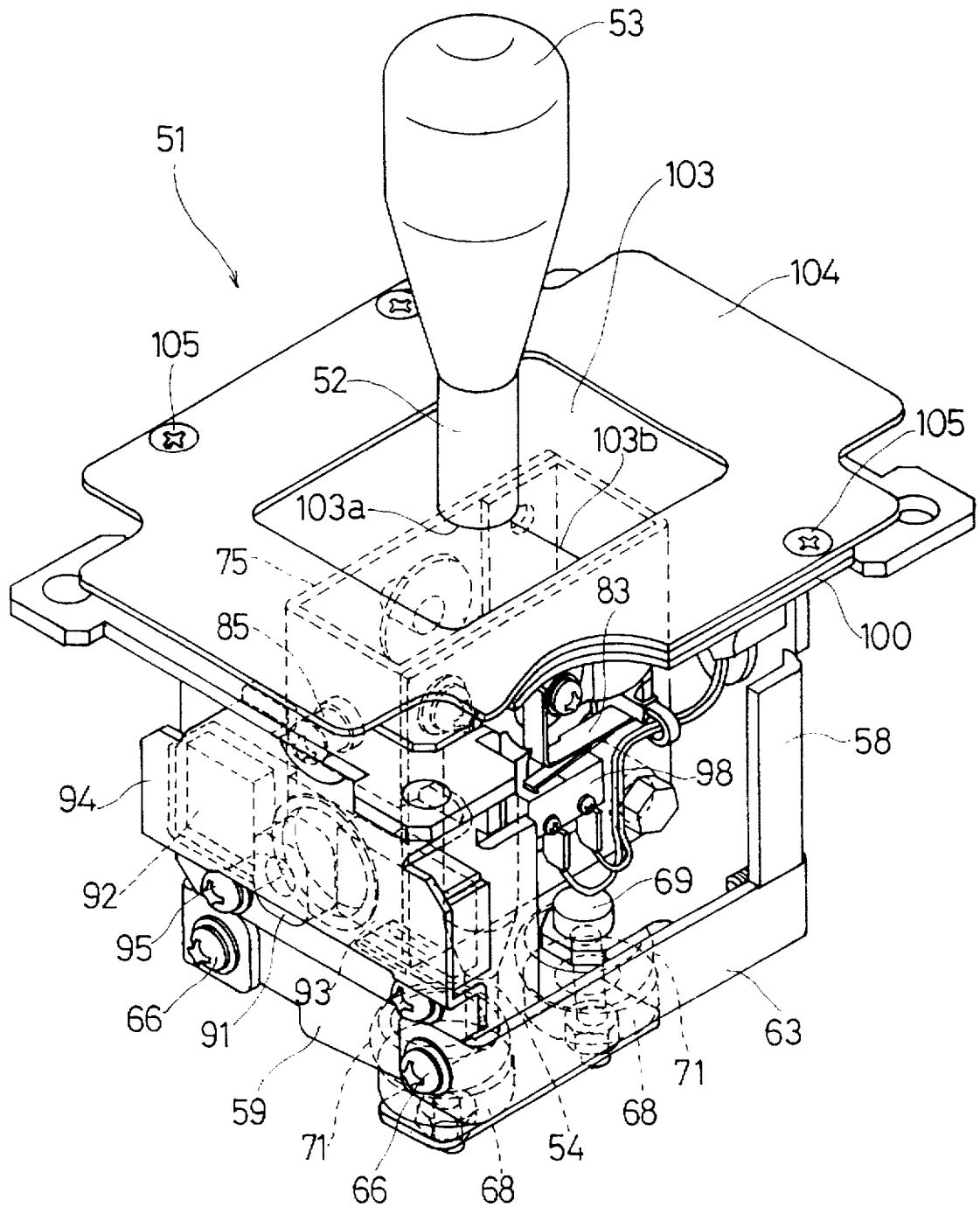
FIG. 7 is a perspective view for showing another preferred embodiment of the present invention.
Figure 8:
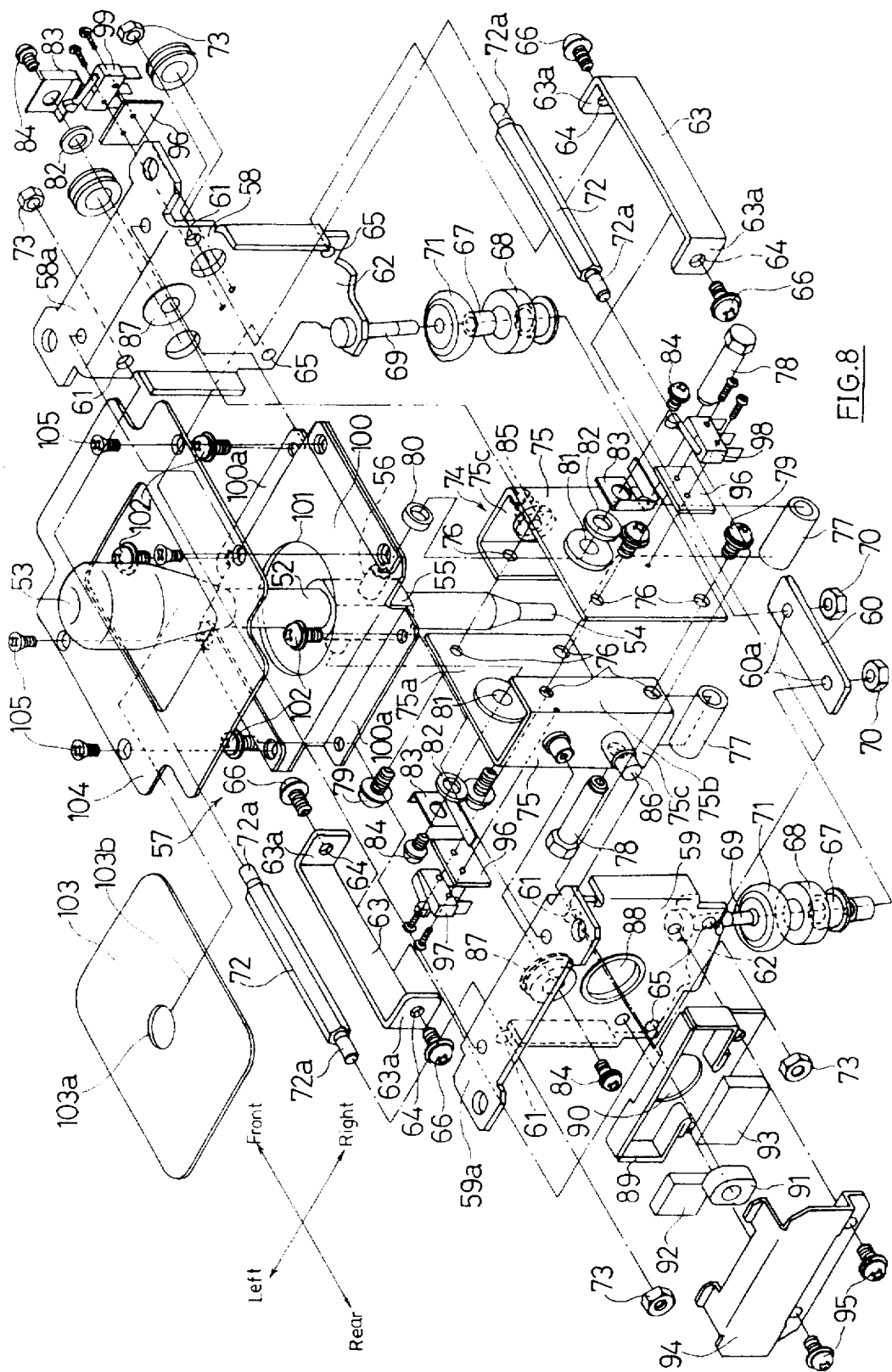
FIG. 8 is an exploded perspective view of FIG. 7.
Figure 9:
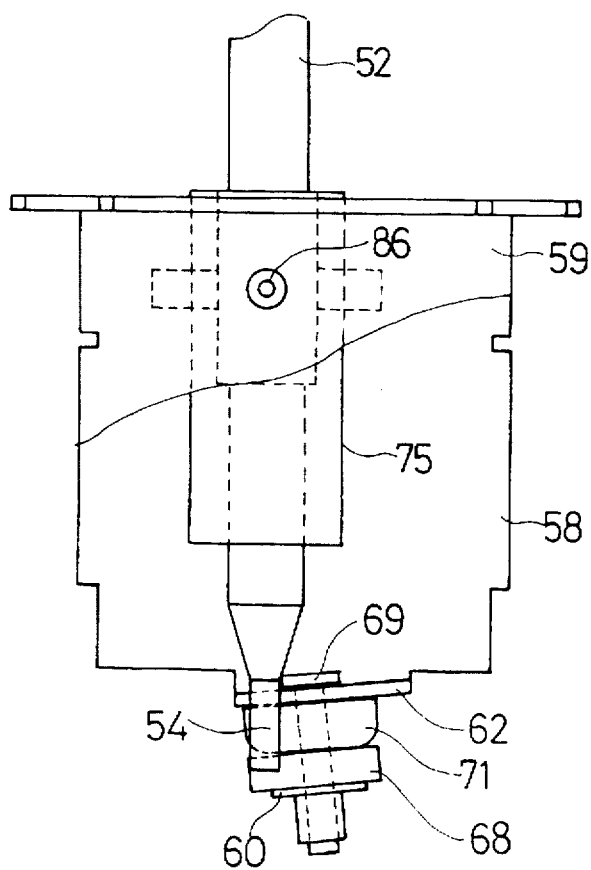
FIG. 9 is a substantial rear view of FIG. 7.
Figure 10:
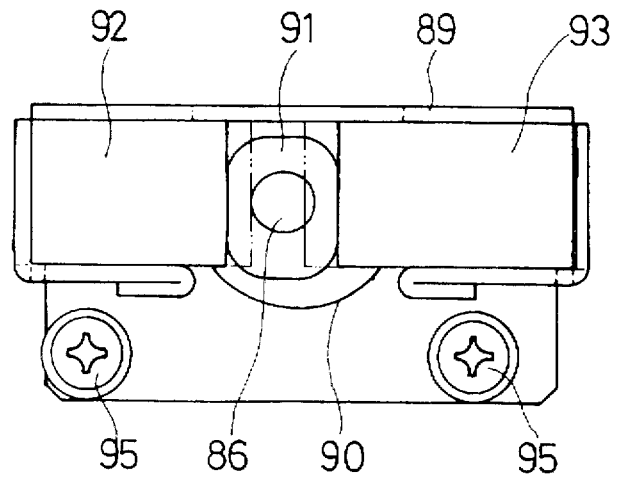
FIG. 10 is a substantial enlarged rear view of FIG. 9 for illustrating the resilient holding and pressing members under a neutral state of the shift lever.
Figure 11:
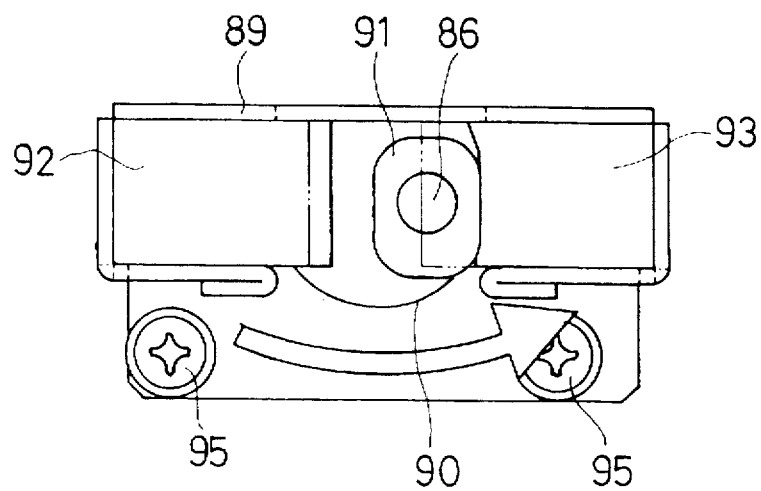
FIG. 11 is a substantial enlarged rear view of FIG. 9 for illustrating a deformed state of the resilient holding and pressing members in the case that the grip of the shift lever is oscillated in a leftward direction.
Figure 12:
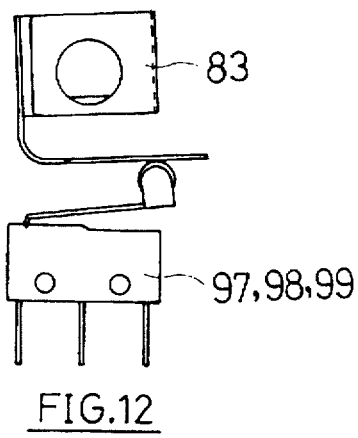
FIG. 12 is a front elevational view for illustrating a fixing relation between the limit switch pushing piece and the oscillation sensing limit switch.
Figure 13:
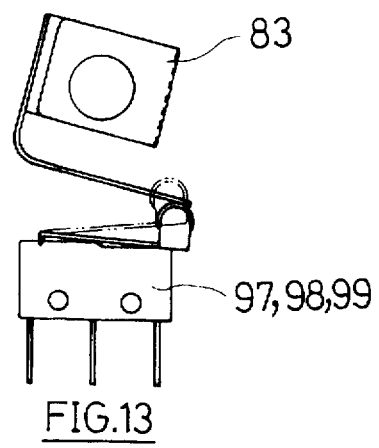
FIG. 13 is a front elevational view for showing a state in which the limit switch pushing switch is oscillated to cause the oscillation sensing limit switches to be operated.
Figure 14:
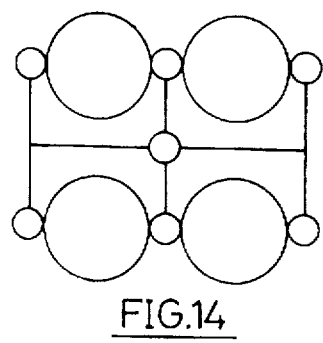
FIG. 14 is a substantial enlarged plan view for illustrating a still further preferred embodiment of the present invention.

In addition, in the case that the shift lever is changed over from the second speed to the third speed, or from the third speed to the second speed, the lower end 4 of the shift lever 2 is moved along a locus approximate to a tangential curved line forming a part of the substantial "8" character around the outer circumferences of the resilient guide rollers 19 as shown in FIG. 3, resulting in that it becomes possible to operate the grip 3 of the shift lever 2 in a pattern of "H" and also it is possible to realize again an operation similar to that of the actual four-speed shift lever operating device.

During these changing-over operations, since the shift lever 2 is not slid along the "H"-shaped guide groove, no striking or no friction may occur and the resilient guide rollers 19, the resilient returning roller 35 and the resilient holding and pressing rollers 38 are resiliently deformed, resulting in that a proper amount of resistance and smoothness are accompanied with it and so it is possible to get a remarkable superior operating feeling.

Since the resilient deformation of the resilient guide rollers 19 is restricted by the guide rollers 21 when the shift lever 2 is changed over while the lower end 4 being contacted with the resilient guide rollers 19, an operating range of the grip 3 is properly maintained.

In addition, each of the resilient returning roller 35 and the resilient holding and pressing rollers 38 can be freely rotated around the bolts 39; the resilient returning roller 35 and the resilient holding and pressing rollers 38 are prevented from being always locally and substantially deformed at the same location; these plastic deformations are prohibited and then the simulating four-stage speed change shift lever operating device 1 can provide a superior operating feeling for a long period of time.

In addition, since the forward oscillation sensing limit switch 43 and the rightward or leftward oscillation sensing limit switch 46 are fixed to the oscillation supporting member 24 and the base block 7 through thin plate brackets 42, 45, even if the forward oscillation sensing limit switch 43 and the rightward or leftward oscillation sensing limit switch 46 are pushed by the lower end 4 or the oscillation supporting member 24 due to the oscillation of the shift lever 2, the brackets 42 and 45 are resiliently deformed and no excessive force is applied to the forward oscillation sensing limit switch 43 and the rightward or leftward oscillation sensing limit switch 46.

Three positions of "forward inclining", "neutral" and "rearward inclining" are detected under a combination of ON-OFF sensing signals of the forward oscillation sensing limit switch 43 and the rearward oscillation sensing limit switch 44; the rightward or leftward oscillation of the shift lever 2 is detected by ON-OFF sensing signals of the rightward or leftward oscillation sensing limit switch 46, and then it can be recognized that the shift lever 2 is operated to what speed change operating position of the four-stage speed change in reference to these forward, neutral, rearward, leftward and rightward sensing signals.

Then, another preferred embodiment of the present invention shown in FIGS. 7 to 13 will be described.

The parts with the reference numerals 51 to 60 and 62 corresponding to each of the constituting elements in the preferred embodiment shown in FIGS. 1 to 6 in each of the constituting elements in the preferred embodiment shown in FIGS. 7 to 13 are added with reference numerals having 50 added to the parts reference numerals shown in FIGS. 1 to 6, and the parts subsequent to the component elements 61 and 63 not corresponding to the former are constituted as follows.

Both ends of the connector plates are bent at a right angle inwardly, the bent pieces 63a at both ends of the connector plates 63 are formed with holes 64 and concurrently the front plate 58 and the rear plate 59 are formed with female screws 65; the bent pieces 63a at both ends of the connector plate 63 are abutted against the outer side surfaces of the front plate 58 and the rear plate 59; and the screws 66 passed through the holes 64 of the both end bent pieces 63a are threadably fitted and fastened to the female screws 65 of the front plate 58 and the rear plate 59.

In addition, the T-shaped bent pieces 62 of the front plate 58 and the rear plate 59 corresponding to the T-shaped bent piece 12 of the front plate 8 and the rear plate 9 are formed with holes (not shown); the guide rollers 71 and the resilient guide rollers 68 are concentrically and rotatably fitted through the bearings 67 to the bolts 69 passing from the upper part to the lower part of the T-shaped bent pieces 62; and the holes 60a of the bottom plate 60 corresponding to the U-shaped plate 10 are fitted to the lower ends of the bolts 69 exposed from the resilient guide rollers 68 in a downward direction and the nuts 70 are threadably fitted to them.

In addition, both upper parts of the front plate 58 and the rear plate 59 are provided with holes 61, the male screws 72a at both ends of the connector plates 72 pass through the holes 61 from inside to outside and then the nuts 73 are threadably fitted and fastened to the male screws 72a at both ends.

In addition, the L-shaped plates 75 of the oscillation supporting member 74 are formed in the same manner as that of the L-shaped plates 25 of the oscillation supporting member 24; the flat plate 75a and the bent part 75b of the L-shaped plates 75 are provided with holes 76; the lever receiving sleeves 77 are installed at the flat plate 75a and the bent portions 75b of the L-shaped plates 75; the flat plate 75a and the bent portion 75b of the forward L-shaped plate 75 and the rearward L-shaped plate 75 are overlapped from each other; the female screws 79 are threadably fitted to the extremity ends of the connector bolts 78 passing through the holes 76 and the lever receiving sleeves 77; and the forward and rearward L-shaped plates 75 are integrally connected from each other.

In addition, the pivot shafts 56 of the shift lever 52 are fitted to the upper central side holes 81 of the flat plate 75a of the L-shaped plate 75 through the bearings 80 in such a manner that the shafts may be freely oscillated in a forward or a rearward direction; the washers 82 and the limit switch pushing pieces 83 are overlapped on the end surfaces of the pivot shafts 56; and thin stainless steel spring limit switch pushing pieces 83 are integrally fitted to the pivot shafts 56 with male screws 84.

In addition, the forward or rearward shaft 85 is projected on the upper part of the forward or rearward end plate 75c of the L-shaped plate 75; a projecting piece 86 is projected and arranged below the rear forward or rearward shaft 85; the forward or rearward shaft 85 is fitted to the upper central bearings 87 of the front plate 58 and the rear plate 59 in such a manner that the shaft may be oscillatably fitted to the bearings; only the male screws 84 are threadably fitted to the extremity end of the rear forward or rearward shaft 85; and concurrently the washers 82 and the limit switch pushing pieces 83 are overlapped at the extremity end surface of the front forward or rearward shaft 85, and then the limit switch pushing pieces 83 are integrally fitted to the front forward or rearward shaft 85 with male screws 84.

In addition, the projecting piece 86 projected rearwardly from the rear L-shaped plate 75 is freely fitted to the large diameter hole 88 of the rear plate 59 and the large diameter hole 90 of the holding member 89 integral with the rear plate 59; a projecting piece 91 is fitted to the projecting piece 86; the flat rectangular resilient holding and pressing members 92, 93 are positioned at both sides of the projecting piece 91 and fitted to the holding member 89; the projecting piece 91, the resilient holding and pressing members 92, 93 are covered by the cover 94; and the cover 94 is integrally fitted to the holding member 89 with the male screws 95.

Then, the bolts 69 passing through the T-shaped bent pieces 62 of the front plate 58 and the rear plate 59, the resilient guide rollers 68 and the guide rollers 71 both of which are fitted to the bolts 69 are displaced in a rightward direction from a vertical plane directed in a forward or a rearward direction passing through a center of the bearings 87, i.e. a center of the shift lever 52 kept in a vertical oriented state; the right resilient holding and pressing member 93 has a thin thickness as compared with that of the left resilient holding and pressing member 92 and formed in an elongated shape in a rightward or a leftward direction, wherein under a neutral condition in which no force is applied to the grip 53, the center of the lower end 54 is positioned at a left side from the center of each of the resilient guide rollers 68 and the guide rollers 71.

To the flat plate portions 75a of the right and left L-shaped plates 75 are fixed a forward oscillation sensing limit switch 97 and a rearward oscillation sensing limit switch 98 and concurrently, the front plate 58 is provided with the rightward or leftward oscillation sensing limit switch 99 through the fixing plates 96.

Top end bent pieces 58a, 59a of the front plate 58 and the rear plate 59 and the forward or rearward bent pieces 100a of the connector plate 100 are integrally fixed with male screws 102; the connector plate 100 is formed with a large circular hole 101 through which the shift lever 52 can pass; a cover 103 and a top plate 104 are overlapped in sequence on the upper surface of the connector plate 100; and the top plate 104 is integrally fixed to the connector plate 100 with the male screws 105 passing through the top plate 104 and threadably fitted to the connector plate 100.

In addition, the cover 103 is formed with a hole 103a and a slit 103b to which the shift lever 52 may be fitted.

The preferred embodiment shown in FIGS. 7 to 13 provides some actions and effects similar to those of the preferred embodiment shown in FIGS. 1 to 6 and additionally it may have the following actions and effects.

The front plate 58 and the rear plate 59 are strongly connected to each other with these bottom plate 60, the connector plate 63, the connector rods 72, the connector plate 100 and the top plate 104 so as to constitute a high resilient base block 57.

Since the resilient guide rollers 68 and the guide rollers 71 are displaced in a rightward direction from the forward or rearward vertical plane passing through the center of the shift lever 52 under its vertical state, the rightward oscillation angle for oscillating the grip 53 in a rightward direction and changing-over the speed to the third speed and the fourth speed is smaller as compared with the leftward oscillation angle by oscillating the grip 53 from its neutral state to a leftward direction and changing-over the speed to the first speed and the second speed, resulting in that it is possible to get an operating feeling similar to the changing-over operation found in the case that an actual vehicle is driven.

In addition, since the left resilient holding and pressing member 92 is thick and short and the right resilient holding and pressing member 93 is thin and long, it is possible to set a spring force of the resilient holding and pressing member 93 when the grip 53 is oscillated widely toward a left side to the same degree of the spring force of the resilient holding and pressing member 92 when the grip 53 is oscillated in a rightward direction and then it is further possible to equalize the right and left operating forces of the grip 53.

In addition, since the end surfaces of resilient holding and pressing members 92, 93 are made flat and both side surfaces of the projecting piece 91 is also made flat, no local substantial deformation is given to the resilient holding and pressing members 92, 93 and then durability of the resilient holding and pressing members 92 and 93 can be improved.

In addition, since the forward oscillation sensing limit switch 97, the rearward oscillation sensing limit switch 98 and the rightward or leftward oscillation sensing limit switch 99 are turned ON or OFF through thin stainless steel spring limit switch pushing pieces 83 which can easily be deformed, it is possible to prevent abnormal high operating force from being applied to the forward oscillation sensing limit switch 97, the rearward oscillation sensing limit switch 98 and the rightward or leftward oscillation sensing limit switch 99 and further to prevent damages of the forward oscillation sensing limit switch 97, the rearward oscillation sensing limit switch 98 and the rightward or leftward oscillation sensing limit switch 99, and further the fixed state of the limit switch pushing pieces 83 can be easily changed, resulting in that ON-OFF position adjustment of each of the forward oscillation sensing limit switch 97, the rearward oscillation sensing limit switch 98 and the rightward or leftward oscillation sensing limit switch 99 can be easily performed.

Although the preferred embodiments shown in FIGS. 1 to 13 are constructed such that each one of the two resilient guide rollers 19 and the two guide rollers 21 acting as the resilient guide rollers, the two connector plates 63 and the two guide rollers 71 is arranged in forward or rearward location, respectively, a total number of four component elements can be arranged in every one element in forward or rearward and rightward or leftward locations, and in this case it is possible to simulate the six-stage speed change operation.

What is claimed is:

1. A simulating multi-stage speed change shift lever operating device in which a shift lever, substantially upright in a vertical direction, is operated along a flat plane in compliance with a predetermined locus having a front, rear, right, and left directional pattern for shifting relative to a user, comprising:
    a base block;
    an oscillation supporting member pivotally supported at said base block;
    the shift lever is pivotally supported at the oscillation supporting member with a lower end extending below the pivotal support;
    a resilient returning means for returning the oscillation supporting member and the shift lever to a vertical plane includes a projecting member extending from said oscillation supporting member, a pair of right and left resilient holding and pressing members for holding said projecting member from the right and left sides and a holding member arranged at said base block for holding said resilient holding and pressing members; and
    a plurality of resilient guide rollers for rotatably contacting and pivoting the shift lever along the forward and rearward direction, wherein the lower end of the shift lever can resiliently contact a circumferential surface of the resilient guide rollers as the user moves the shift lever along the directional pattern about a periphery of a contacted resilient guide roller to provide a curved locus of movement.

2. A simulating multi-stage speed change shift lever operating device in which a shift lever, substantially upright in a vertical direction, is operated along a flat plane in compliance with a predetermined locus having a front, rear, right, and left directional pattern for shifting relative to a user, comprising:
    a base block;
    an oscillation supporting member pivotally supported at said base block;
    the shift lever is pivotally supported at the oscillation supporting member with a lower end extending below the pivotal support;
    a resilient returning means for returning the oscillation supporting member and the shift lever to a vertical plane includes a resilient returning roller rotatably pivoted to said oscillation supporting member and a pair of resilient holding and pressing members attached to said base block while holding said resilient returning roller from its right and left sides; and
    a plurality of resilient guide rollers for rotatably contacting and pivoting the shift lever along the forward and rearward direction, wherein the lower end of the shift lever can resiliently contact a circumferential surface of the resilient guide rollers as the user moves the shift lever along the directional pattern about a periphery of a contacted resilient guide roller to provide a curved locus of movement.

3. A simulating multi-stage speed change shift lever operating device in which a shift lever substantially upright in a vertical direction is operated along a flat plane in compliance with a predetermined locus having a front, rear, right, and left directional pattern relative to a user, comprising:
    a base block;
    an oscillation supporting member pivotally supported at said base block around a first axis directed in a front-and-rear direction, the shift lever pivotally supported at the oscillation supporting member around a second axis directed perpendicularly to said first axis;
    a resilient returning means for biasing the oscillation supporting member and the shift lever to one of a first vertical plane passing through said first axis and a second vertical plane passing through an axis parallel with the first axis including a projecting member extending from said oscillation supporting member, a pair of right and left resilient holding and pressing members for holding said projecting member from right and left sides, and a holding member arranged at said base block base block for holding said resilient holding and pressing member; and
    a plurality of resilient guide rollers positioned adjacent a lower end of said shift lever and rotatably pivoted around vertical axes, and wherein the lower end of the shift lever can contact with circumferential surfaces of the resilient guide rollers as the user moves the shift lever through the directional pattern so that the lower end of the shift lever provides a curved locus of movement around the guide rollers.

4. A simulating multi-stage speed change shift lever operating device according to claim 3, characterized in that said two resilient guide rollers are arranged at a right side of and below said first axis.

5. A simulating multistage speed change shift lever operating device in which a shift lever substantially upright in a vertical direction is operated along, a flat plane in compliance with a predetermined locus having a front, rear, right, and left directional pattern relative to a user, comprising:
    a base block;

an oscillation supporting member pivotally supported at said base block around a first axis directed in a front-and-rear direction, the shift lever pivotally supported at the oscillation supporting member around a second axis directed perpendicularly to said first axis;

a resilient returning means for biasing, the oscillation supporting member and the shift lever to one of a first vertical plane passing through said first axis and a second vertical plane passing through an axis parallel with the first axis includes a resilient returning roller rotatably pivoted to said oscillation supporting member around the first axis, and a resilient holding, and pressing roller rotatably pivoted to said base block around axes in the front-and-rear direction for holding said resilient returning, roller from the right and left sides; and a plurality of resilient guide rollers positioned adjacent a lower end of said shift lever and rotatably pivoted around vertical axes, and wherein the lower end of the shift lever can contact with circumferential surfaces of the resilient guide rollers as the user moves the shift lever through the directional pattern so that the lower end of the shift lever provides a curved locus of movement around the guide rollers.

6. A simulating gear shift lever device to emulate the movements of changing gears in a vehicle in accordance with a predetermined shift pattern comprising:

a shift lever having an upper portion for providing a grip to an operator and a lower portion;

means for pivotally mounting the shift lever at an intermediate point between the upper and lower portions of the shift lever to enable movement along the shift pattern includes a base member, a shaft operatively connected to the shift lever and extending through the base member, a resilient member mounted on the shaft, and a pair of resilient stop members mounted respectively on opposite sides of the resilient member to contact the resilient member and bias the shift lever to a predetermined position; and a plurality of resilient guide rollers positioned to contact the lower end of the shift lever and to resiliently guide the shift lever through a curved locus of movement as it is moved through the predetermined shift pattern.

7. The invention of claim 6 wherein the shift pattern includes a neutral position with the shift lever extending perpendicular to rotational axes of the guide rollers, the guide rollers rotatable about their respective rotational axes.

8. The invention of claim 7 wherein the resilient guide rollers further include adjacent steel rollers.

9. The invention of claim 6 further including an oscillation supporting member connected to the shaft and pivotally connected to the shift lever and a plurality of limit switches connected to the oscillation support member to provide signals representative of the position of the shift lever.

10. A simulating multi-stage speed change shift lever operating device in which a shift lever substantially upright in a vertical direction is operated along a flat plane in compliance with a predetermined locus having a front, rear, right and left directional pattern for shifting relative to a user, comprising:

a base block;

an oscillation supporting member pivotally supported for movement relative to said base block around a first axis directed in a front-and-rear direction, the shift lever pivotally supported for movement relative to said oscillation supporting member around a second axis directed perpendicularly to said first axis with a lower end extending below said oscillation supporting member;

a resilient returning means for biasing the oscillation supporting member and the shift lever to a vertical plane passing through said first axis; and a plurality of resilient guide rollers positioned adjacent a lower end of said shift lever and rotatably pivoted around vertical axes displaced from said vertical plane passing through said first axis in a right-and-left direction, the lower end of the shift lever contacts circumferential surfaces of the resilient guide rollers as the user moves the shift lever through the directional pattern so that the lower end of the shift lever provides a curved locus of movement as it contacts and moves around the guide rollers.

11. A simulating multi-stage speed change shift lever operating device according to claim 10, wherein said resilient returning means is comprised of a projecting member extending from said oscillation supporting member, a pair of right and left resilient holding and pressing members for holding said projecting member from right and left sides, and a holding member arranged at said base block for holding said resilient holding and pressing members.

12. A simulating multi-stage speed change shift lever operating device according to claim 11, wherein said projecting member is parallel with and positioned below said first axis, and one of said resilient holding and pressing members arranged on the same side as said vertical axes of said resilient guide rollers with respect to said vertical plane passing through said first axis has a spring constant smaller than that of the other resilient holding and pressing member.

13. A simulating multi-stage speed change shift lever operating device according to claim 12, wherein said resilient holding and pressing members are formed in flat and rectangular shapes, and said one of the resilient holding and pressing members is thinner and longer compared with said other resilient holding and pressing member.

14. A simulating multi-stage speed change shift lever operating device according to claim 11 wherein one of the right and left resilient holding and pressing members is of a different size than the other to bias the shift lever towards a predetermined direction in a neutral shift position.

15. A simulating multi-stage speed change shift lever operating device according to claim 10 further including a second set of rollers, concentrically and rotatably mounted with the plurality of resilient guide rollers.

16. A simulating multi-stage speed change shift lever operating device according to claim 10 further including an oscillation sensory limit switch for providing a signal representative of the position of the oscillation supporting member.

* * * * *